(12) United States Patent
Heisel et al.

(10) Patent No.: US 9,809,130 B2
(45) Date of Patent: Nov. 7, 2017

(54) VEHICLE SPEED CONTROL SYSTEMS AND METHODS

(71) Applicant: GM Global Technology Operations LLC, Detroit, MI (US)

(72) Inventors: Adam J. Heisel, South Lyon, MI (US); Christopher J. Twarog, Franklin, MI (US); Anthony H. Heap, Ann Arbor, MI (US); Derek S. Bonderczuk, Wixom, MI (US); Krunal P. Patel, Sterling Heights, MI (US); Lawrence A. Kaminsky, White Lake, MI (US); Nathaniel S. Michaluk, Milford, MI (US); Robert L. Morris, Milford, MI (US); Shaochun Ye, Northville, MI (US); Jeffrey J. Waldner, New Hudson, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 36 days.

(21) Appl. No.: 15/079,412

(22) Filed: Mar. 24, 2016

(65) Prior Publication Data
US 2017/0136916 A1 May 18, 2017

Related U.S. Application Data

(60) Provisional application No. 62/254,436, filed on Nov. 12, 2015.

(51) Int. Cl.
*B60L 15/20* (2006.01)

(52) U.S. Cl.
CPC .................................. *B60L 15/20* (2013.01)

(58) Field of Classification Search
CPC ....................................................... B60L 15/20
See application file for complete search history.

(56) References Cited

U.S. PATENT DOCUMENTS

| 2016/0001774 A1* | 1/2016 | Nakada | B60W 10/04 |
| | | | 701/22 |
| 2017/0001642 A1* | 1/2017 | Kumai | B60W 30/16 |

OTHER PUBLICATIONS

U.S. Appl. No. 15/079,596, filed Mar. 24, 2016, Heisel et al.

* cited by examiner

*Primary Examiner* — Adam Alharbi

(57) ABSTRACT

An electric motor control system for a vehicle includes a vehicle speed module that determines a vehicle speed. A closed loop (CL) module determines a CL torque based on a difference between a target vehicle speed and the vehicle speed. A motor torque module determines a motor torque based on the CL torque and a motor torque request determined based on a position of an accelerator pedal. A switching control module controls switching of an inverter based on the motor torque to control application of power to an electric motor of the vehicle.

16 Claims, 7 Drawing Sheets

VEHICLE SPEED CONTROL SYSTEMS AND METHODS

CROSS-REFERENCE TO RELATED APPLICATIONS

This application claims the benefit of U.S. Provisional Application No. 62/254,436, filed on Nov. 12, 2015. The disclosure of the above application is incorporated herein by reference in its entirety.

This application is related to U.S. patent application Ser. No. 15/079,596 filed on Mar. 24, 2016. The disclosure of the above application is incorporated herein by reference in its entirety.

FIELD

The present disclosure relates to vehicle engines and motors and more particularly to systems and methods for controlling vehicle speed.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Air flow into the engine is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders and/or to achieve a desired torque output. Increasing the amount of air and fuel provided to the cylinders increases the torque output of the engine.

In addition to an internal combustion engine, or as an alternative to an internal combustion engine, some vehicles may include one or more electric motors or motor generators that generate propulsion torque. Such vehicles are sometimes referred to as hybrid vehicles or electric vehicles.

SUMMARY

In a feature, an electric motor control system for a vehicle is described. A vehicle speed module determines a vehicle speed. A closed loop (CL) module determines a CL torque based on a difference between a target vehicle speed and the vehicle speed. A motor torque module determines a motor torque based on the CL torque and a motor torque request determined based on a position of an accelerator pedal. A switching control module controls switching of an inverter based on the motor torque to control application of power to an electric motor of the vehicle.

In further features, a target speed module selectively sets the target vehicle speed based on adjusting the vehicle speed to a predetermined speed of zero.

In further features, the target speed module sets the target vehicle speed based on adjusting the vehicle to the predetermined speed of zero in response to receipt of an input by a driver to an input device that is different than the accelerator pedal and a brake pedal.

In further features, the CL module determines the CL torque to adjust the difference between the target vehicle speed and the vehicle speed toward zero.

In further features, the motor torque module determines the motor torque further based on a feedforward (FF) torque.

6 In further features, the motor torque module: determines a first motor torque based on a sum of the CL torque, the FF torque, and the motor torque request; rate limits changes in the first motor torque to first and second maximum amounts to produce a rate limited motor torque; determines a second motor torque based on a sum of the rate limited motor torque and a selected torque; and limits the second motor torque to between upper and lower torque limits to produce the motor torque.

In further features, the motor torque module: sets the first and second maximum amounts to first and second predetermined values, respectively, when a CL state is in a first state; and sets the first and second amounts to third and fourth predetermined values, respectively, when the CL state is in a second state.

In further features, the motor torque module: sets the selected torque to the CL torque when the CL state is in the first state; and sets the selected torque to zero when the CL state is in the second state.

In further features, a FF module sets the FF torque based on a stored value of the FF torque when the vehicle speed is zero and a drive mode transitions from a drive mode to a low mode.

In further features, a storing module stores the CL torque when at least one of: a driver actuates the accelerator pedal away from a first resting position; and the driver actuates a brake pedal away from a second resting position. The CL module sets the CL torque equal to the stored CL torque when, after the at least one of the actuation of the accelerator pedal and the brake pedal, the accelerator pedal and the brake pedal are in the first and second resting positions, respectively, and determines the CL torque based on the difference after the setting.

In a feature, an electric motor control method for a vehicle includes: determining a vehicle speed; determining a closed loop (CL) torque based on a difference between a target vehicle speed and the vehicle speed; determining a motor torque based on the CL torque and a motor torque request determined based on a position of an accelerator pedal; and controlling switching of an inverter based on the motor torque to control application of power to an electric motor of the vehicle.

In further features, the electric motor control method further includes selectively setting the target vehicle speed based on adjusting the vehicle speed to a predetermined speed of zero.

In further features, selectively setting the target speed includes setting the target vehicle speed based on adjusting the vehicle to the predetermined speed of zero in response to receipt of an input by a driver to an input device that is different than the accelerator pedal and a brake pedal.

In further features, determining the CL torque includes determining the CL torque to adjust the difference between the target vehicle speed and the vehicle speed toward zero.

In further features, determining the motor torque includes determining the motor torque further based on a feedforward (FF) torque.

In further features, determining the motor torque includes: determining a first motor torque based on a sum of the CL torque, the FF torque, and the motor torque request; rate limiting changes in the first motor torque to first and second maximum amounts to produce a rate limited motor torque;

determining a second motor torque based on a sum of the rate limited motor torque and a selected torque; and limiting the second motor torque to between upper and lower torque limits to produce the motor torque.

In further features, determining the motor torque includes: setting the first and second maximum amounts to first and second predetermined values, respectively, when a CL state is in a first state; and setting the first and second amounts to third and fourth predetermined values, respectively, when the CL state is in a second state.

In further features, determining the motor torque includes: setting the selected torque to the CL torque when the CL state is in the first state; and setting the selected torque to zero when the CL state is in the second state.

In further features, the electric motor control method further includes setting the FF torque based on a stored value of the FF torque when the vehicle speed is zero and a drive mode transitions from a drive mode to a low mode.

In further features, the electric motor control method further includes storing the CL torque when at least one of: a driver actuates the accelerator pedal away from a first resting position; and the driver actuates a brake pedal away from a second resting position. Setting the CL torque includes: setting the CL torque equal to the stored CL torque when, after the at least one of the actuation of the accelerator pedal and the brake pedal, the accelerator pedal and the brake pedal are in the first and second resting positions, respectively; and determining the CL torque based on the difference after the setting.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A vehicle includes one or more motor generator units (MGUs) that can generate propulsion torque for a vehicle. For example, an MGU may be controlled to output positive torque to propel the vehicle when a driver actuates an accelerator pedal. The positive torque output may be used alone or in combination with torque output of an internal combustion engine to propel the vehicle. The MGU can also be controlled to output negative propulsion torque under some circumstances, such as to hold the vehicle stationary on a hill.

An MGU can also be used to convert mechanical energy into electrical energy under some circumstances. For example, an MGU can be operated to convert mechanical energy into electrical energy when the driver releases the accelerator pedal. Controlling the MGU to convert mechanical energy into electrical energy may be referred to as regeneration.

In addition to an accelerator pedal and a brake pedal, a vehicle includes an input device (e.g., a paddle, button, switch, etc.) for receiving driver input to decelerate the vehicle. The driver may interface the input device, for example, to decelerate the vehicle down to stop. Use of the input device may enable the driver to slow the vehicle while minimizing the use/wear of mechanical brakes.

A control module controls the MGU(s) of the vehicle to control deceleration of the vehicle according to a target vehicle speed profile using closed loop control. Once stopped, the control module controls the MGU(s) to maintain the vehicle stopped, even on roads having non-zero grades. If the vehicle comes to a stop facing downhill while in a forward drive mode, the control module controls the MGU(s) to produce negative torque to maintain the vehicle stopped.

Figure 1:
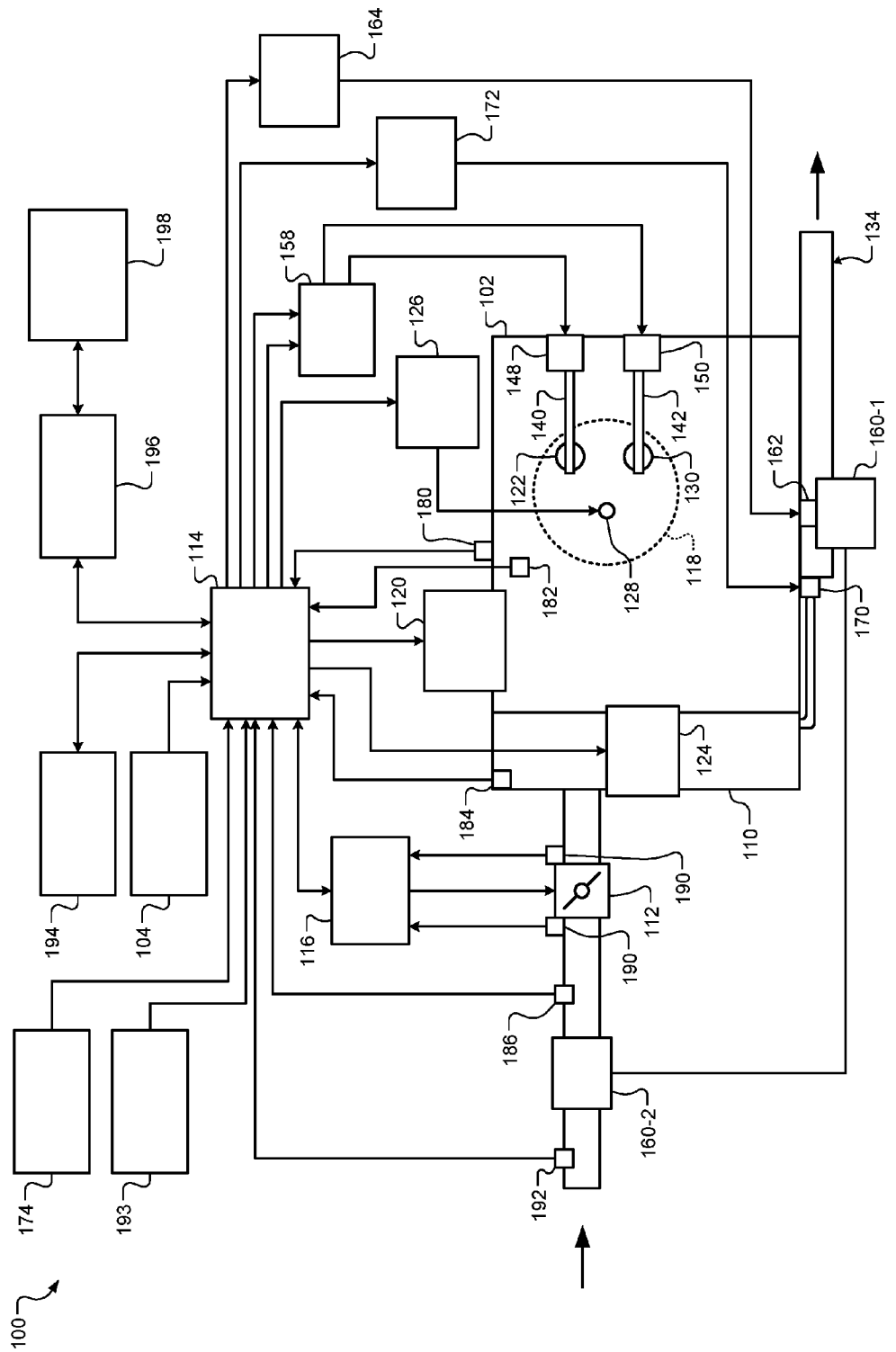
FIG. 1 is a functional block diagram of an example engine system.

Referring now to FIG. 1, a functional block diagram of an example engine system 100 is presented. The engine system 100 includes an engine 102 that combusts an air/fuel mixture to produce drive torque for a vehicle based on driver input from a driver input module 104. The engine 102 may be a gasoline spark ignition internal combustion engine or another suitable type of engine. While the example of a vehicle including an engine is presented, the present application is also applicable to vehicles that do not include an engine, such as electric vehicles.

Air is drawn into an intake manifold 110 through a throttle valve 112. For example only, the throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, or 12 cylinders. The ECM 114 may instruct a cylinder actuator module 120 to selectively deactivate some of the cylinders. Deactivating one or more cylinders may improve fuel economy under certain engine operating conditions.

The engine 102 may operate using a four-stroke cycle or another operating cycle. The four strokes of the four-stroke cycle, described below, may be referred to as the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injection to achieve a target air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. A spark actuator module 126 energizes a spark plug 128 in the cylinder 118 based on a signal from the ECM 114, which ignites the air/fuel mixture. The timing of the spark may be specified relative to the time when the piston is at its topmost position, referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with crankshaft angle. Generating spark may be referred to as a firing event. The spark actuator module 126 may have the ability to vary the timing of the spark for each firing event. The spark actuator module 126 may vary the spark timing for a next firing event when the spark timing is changed between a last firing event and the next firing event. The spark actuator module 126 may halt provision of spark to deactivated cylinders.

During the combustion stroke, the combustion of the air/fuel mixture drives the piston away from TDC, thereby driving the crankshaft. The combustion stroke may be defined as the time between the piston reaching TDC and the time at which the piston reaches bottom dead center (BDC). During the exhaust stroke, the piston begins moving away from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118). In various other implementations, the intake valve 122 and/or the exhaust valve 130 may be controlled by devices other than camshafts, such as camless valve actuators. The cylinder actuator module 120 may deactivate the cylinder 118 by disabling opening of the intake valve 122 and/or the exhaust valve 130.

The time when the intake valve 122 is opened may be varied with respect to piston TDC by an intake cam phaser 148. The time when the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. When implemented, variable valve lift (not shown) may also be controlled by the phaser actuator module 158.

The engine system 100 may include one or more boost devices, such as a turbocharger. The turbocharger includes a hot turbine 160-1 that is powered by hot exhaust gases flowing through the exhaust system 134. The turbocharger also includes a cold air compressor 160-2 that is driven by the turbine 160-1. The compressor 160-2 compresses air leading into the throttle valve 112. In various implementations, a supercharger (not shown), driven by the crankshaft, may compress air from the throttle valve 112 and deliver the compressed air to the intake manifold 110.

A wastegate 162 may allow exhaust to bypass the turbine 160-1, thereby reducing the boost (the amount of intake air compression) provided by the turbocharger. A boost actuator module 164 may control the boost of the turbocharger by controlling opening of the wastegate 162. In various implementations, two or more turbochargers may be implemented and may be controlled by the boost actuator module 164.

An air cooler (not shown) may transfer heat from the compressed air charge to a cooling medium, such as engine coolant or air. An air cooler that cools the compressed air charge using engine coolant may be referred to as an intercooler. An air cooler that cools the compressed air charge using air may be referred to as a charge air cooler. The compressed air charge may receive heat, for example, via compression and/or from components of the exhaust system 134. Although shown separated for purposes of illustration, the turbine 160-1 and the compressor 160-2 may be attached to each other, placing intake air in close proximity to hot exhaust.

The engine system 100 may include an exhaust gas recirculation (EGR) valve 170, which selectively redirects exhaust gas back to the intake manifold 110. The EGR valve 170 may be located upstream of the turbocharger's turbine 160-1. The EGR valve 170 may be controlled by an EGR actuator module 172 based on signals from the ECM 114.

The vehicle may include a paddle that a driver can actuate, for example, to decelerate the vehicle in an effort to minimize or prevent the use of mechanical/friction brakes. The driver can apply the mechanical brakes via depressing a brake pedal (not shown). Use of the paddle, however, enables the driver to decelerate the vehicle without the use of the mechanical brakes, thereby minimizing wear of the mechanical brakes. Deceleration may be accomplished, for example, via regenerative braking and/or use of one or more electric motors. A paddle sensor 174 monitors actuation of the paddle and generates a signal indicative of whether the paddle is actuated or not. While the example of a paddle is provided, a button, switch, knob, or another suitable type of actuator may be used. Regenerative braking may additionally or alternatively be performed under some circumstances when the paddle is not actuated. Regenerative braking may be used independently or in combination with mechanical braking.

A position of the crankshaft may be measured using a crankshaft position sensor 180. A rotational speed of the crankshaft (an engine speed) may be determined based on the crankshaft position. A temperature of the engine coolant may be measured using an engine coolant temperature (ECT) sensor 182. The ECT sensor 182 may be located within the engine 102 or at other locations where the coolant is circulated, such as a radiator (not shown).

A pressure within the intake manifold 110 may be measured using a manifold absolute pressure (MAP) sensor 184. In various implementations, engine vacuum, which is the difference between ambient air pressure and the pressure within the intake manifold 110, may be measured. A mass flow rate of air flowing into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. An ambient temperature of air being drawn into the engine 102 may be measured using an intake air temperature (IAT) sensor 192. The engine system 100 may also include one or more other sensors 193, such as an ambient humidity sensor, one or more knock sensors, a compressor outlet pressure sensor and/or a throttle inlet pressure sensor, a wastegate position sensor, an EGR position sensor, and/or one or more other suitable sensors. The ECM 114 may use signals from the sensors to make control decisions for the engine system 100.

The ECM 114 may communicate with a transmission control module 194 to coordinate shifting gears in a transmission (not shown). For example, the ECM 114 may reduce engine torque during a gear shift. The ECM 114 may communicate with a hybrid control module 196 to coordinate operation of the engine 102 and one or more motor generator units (MGUs), such as MGU 198. MGUs can generate torque for the intended direction of travel (sometimes referred to as positive torque) and can generate torque for the direction opposite that of the intended direction of travel (sometimes referred to as negative torque). Negative torque may be used, for example, to hold a vehicle facing down a hill when the vehicle is in drive. MGUs can also operate as a generator to produce electrical energy, for example, for use by vehicle electrical systems and/or for storage in a battery. In various implementations, various functions of the ECM 114, the transmission control module 194, and the hybrid control module 196 may be integrated into one or more modules.

Each system that varies an engine parameter may be referred to as an engine actuator. For example, the throttle actuator module 116 may adjust opening of the throttle valve 112 to achieve a target throttle opening area. The spark actuator module 126 controls the spark plugs to achieve a target spark timing relative to piston TDC. The fuel actuator module 124 controls the fuel injectors to achieve target fueling parameters. The phaser actuator module 158 may control the intake and exhaust cam phasers 148 and 150 to achieve target intake and exhaust cam phaser angles, respectively. The EGR actuator module 172 may control the EGR valve 170 to achieve a target EGR opening area. The boost actuator module 164 controls the wastegate 162 to achieve a target wastegate opening area. The cylinder actuator module 120 controls cylinder deactivation to achieve a target number of activated or deactivated cylinders. The ECM 114 generates the target values for the engine actuators to cause the engine 102 to generate a target engine output torque.

Figure 2:
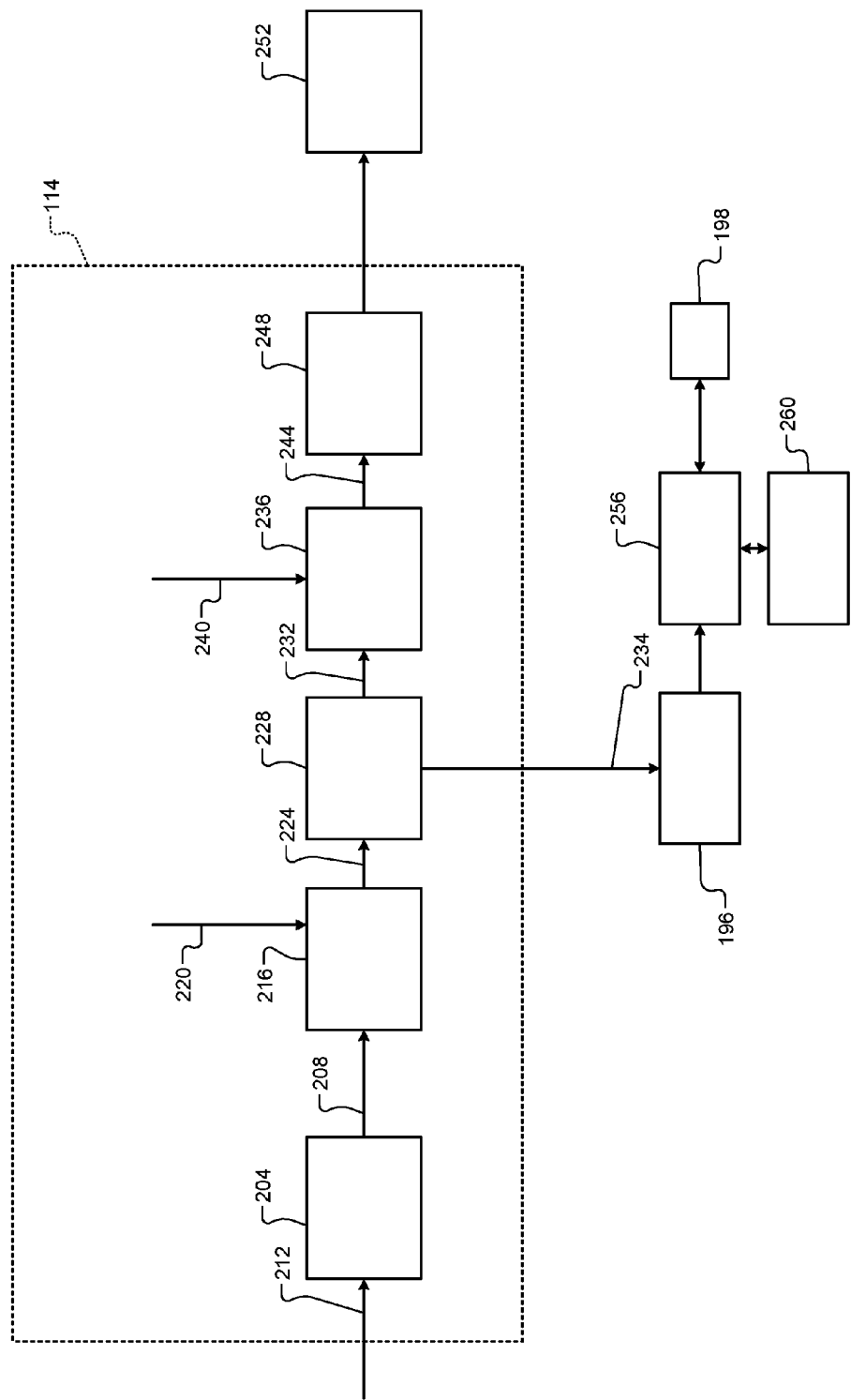
FIG. 2 is a functional block diagram of an example engine control system.

Referring now to FIG. 2, a functional block diagram of an example engine control system is presented. The ECM 114 includes a driver torque module 204 that determines a driver torque request 208 based on driver input 212. The driver input 212 may include, for example, an accelerator pedal position (APP), a brake pedal position (BPP), and/or cruise control input. In various implementations, the cruise control input may be provided by an adaptive cruise control system that attempts to maintain at least a predetermined distance between the vehicle and objects in a path of the vehicle. The driver torque module 204 determine the driver torque request 208 based on one or more lookup tables that relate the driver inputs to driver torque requests. The APP and BPP may be measured using one or more APP sensors and BPP sensors, respectively.

The driver torque request 208 is an axle torque request. Axle torques (including axle torque requests) refer to torque at the wheels. As discussed further below, propulsion torques (including propulsion torque requests) are different than axle torques in that propulsion torques may refer to torque at a transmission input shaft.

An axle torque arbitration module 216 arbitrates between the driver torque request 208 and other axle torque requests 220. Axle torque (torque at the wheels) may be produced by various sources including the engine 102 and/or one or more MGUs, such as MGU 198. Examples of the other axle torque requests 220 include, but are not limited to, a torque reduction requested by a traction control system when positive wheel slip is detected, a torque increase request to counteract negative wheel slip, brake management requests to reduce axle torque to ensure that the axle torque does not exceed the ability of the brakes to hold the vehicle when the vehicle is stopped, and vehicle over-speed torque requests to reduce the axle torque to prevent the vehicle from exceeding a predetermined speed. The axle torque arbitration module 216 outputs one or more axle torque requests 224 based on the results of arbitrating between the received axle torque requests 208 and 220.

A hybrid module 228 may determine how much torque should be produced by the engine 102 and how much torque should be produced by the MGU(s) 198. The hybrid module 228 outputs one or more engine torque requests 232 to a propulsion torque arbitration module 236. The engine torque requests 232 indicate a requested torque output of the engine 102. The hybrid module 228 also outputs a motor torque request 234 to the hybrid control module 196. The motor torque request 234 indicates a requested torque output (positive or negative) of the MGU(s) 198.

The propulsion torque arbitration module 236 converts the engine torque requests 232 from an axle torque domain (torque at the wheels) into a propulsion torque domain (e.g., torque at an input shaft of the transmission). The propulsion torque arbitration module 236 arbitrates the converted torque requests with other propulsion torque requests 240. Examples of the other propulsion torque requests 240 include, but are not limited to, torque reductions requested for engine over-speed protection and torque increases requested for stall prevention. The propulsion torque arbitration module 236 may output one or more propulsion torque requests 244 as a result of the arbitration.

An actuator control module 248 controls one or more actuators 252 of the engine 102 based on the propulsion torque requests 244. Based on the propulsion torque requests 244, the actuator control module 248 may control opening of the throttle valve 112, timing of spark provided by spark plugs, timing and amount of fuel injected by fuel injectors, cylinder actuation/deactivation, intake and exhaust valve phasing, output of one or more boost devices (e.g., turbochargers, superchargers, etc.), opening of the EGR valve 170, and/or one or more other engine actuators. In various implementations, the propulsion torque requests 244 may be adjusted or modified before use by the actuator control module 248, such as to create a torque reserve.

The hybrid control module 196 controls switching of an inverter module 256 based on the motor torque request 234. Switching of the inverter module 256 controls power flow from an energy storage device (ESD) 260, such as one or more batteries, to the MGU(s) 198. As such, switching of the inverter module 256 controls torque of the MGU(s) 198. Switching of the inverter module 256 also controls power flow from the MGU(s) 198 to the ESD 260, such as mechanical energy converted into electrical energy by the MGU(s) 198 via regeneration.

Figure 3:
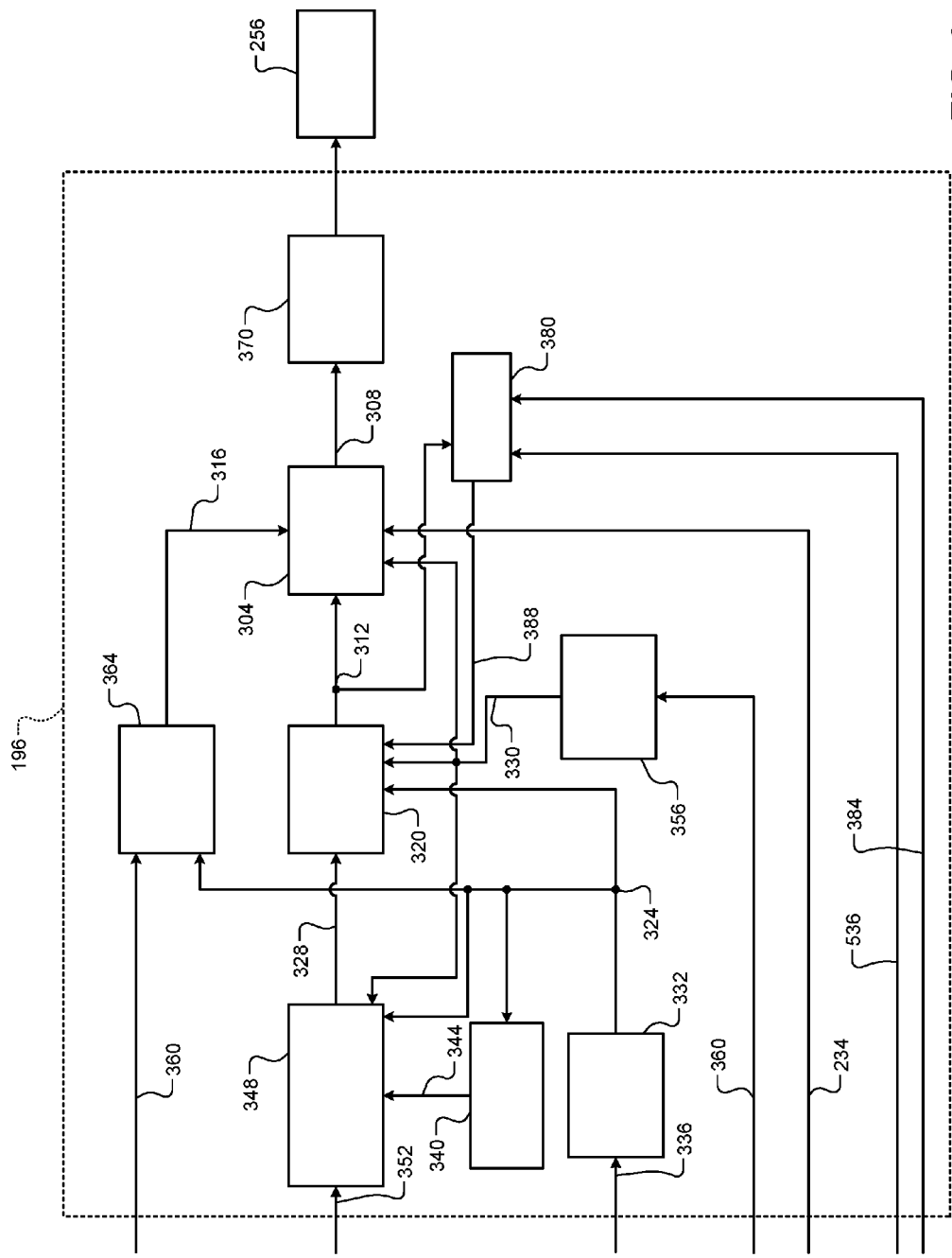
FIG. 3 is a functional block diagram including an example implementation of a hybrid control module.

FIG. 3 includes a functional block diagram of an example implementation of the hybrid control module 196. The hybrid control module 196 includes a motor torque module 304 (see also FIG. 4) that determines a motor torque 308 for the MGU(s) 198 based on the motor torque request 234, a closed loop (CL) torque 312, and a feed forward (FF) torque 316. The motor torque module 304 is discussed further below.

A CL module 320 determines the CL torque 312. For example, the CL module 320 may determine the CL torque 312 based on adjusting a difference between a vehicle speed 324 and a target vehicle speed 328 toward zero using CL feedback control when a CL state 330 is in an active state. The CL torque 312 may be positive or negative. For example, the CL torque 312 may be negative when the vehicle rolls forward down a grade while the target vehicle speed 328 is zero. The negative CL torque 312 causes the MGU(s) 198 to produce negative torque to stop and maintain the vehicle at zero speed despite facing down the grade. Generally stated, the CL torque 312 may be negative when the vehicle speed 324 is greater than the target vehicle speed 328 and positive when the vehicle speed 324 is less than the target vehicle speed 328.

The CL module 320 may include, for example, a proportional integral (PI) controller that determines the CL torque 312 based on the difference between the vehicle speed 324 and the target vehicle speed 328. While the example of a PI controller is provided, another suitable CL controller may be used.

A vehicle speed module 332 determines the vehicle speed 324. For example, the vehicle speed module 332 may determine the vehicle speed 324 based on one or more motor speeds 336 of the MGU(s) 198, respectively. The vehicle speed module 332 may set the vehicle speed 324, for example, based on or equal to an average of the motor speeds 336. The motor speeds 336 may be measured, for example, using motor speed (or position) sensors associated with the MGU(s) 198. While the example of determining the vehicle speed 324 based on the motor speed(s) 336 is provided, the vehicle speed 324 may be determined in another suitable manner, such as based on one or more wheel speeds of the vehicle or based on a rotational speed of a shaft of the transmission or the driveline of the vehicle.

A vehicle acceleration module 340 determines a present vehicle acceleration 344 based on the vehicle speed 324. For example, the vehicle acceleration module 340 may determine the vehicle speed 324 based on a change in the vehicle speed 324 over a predetermined period, such as one control loop.

A target speed module 348 determines a target vehicle speed profile for a future period and, more specifically, for a future number of control loops when the CL state 330 transitions to the active state. During each control loop while the CL state 330 is in the active state, the target speed module 348 selects a next target vehicle speed from the target vehicle speed profile and sets the target vehicle speed 328 to the selected vehicle speed.

The paddle sensor 174 may generate a paddle state 352 to indicate whether the paddle is actuated. The target speed module 348 may determine the target vehicle speed profile for adjusting the vehicle from the present vehicle speed 324 to zero when the paddle state 352 indicates that the paddle is actuated.

The target speed module 348 may determine the target vehicle speed profile for adjusting the vehicle speed 324 (e.g., to zero), for example, based on the present vehicle speed 324 and the present vehicle acceleration 344 when the CL state 330 transitions to the active state and/or when the paddle state 352 changes while the CL state 330 is in the active state.

The target vehicle speed profile may include three phases, a first phase occurring during a first period of the future period, a second phase occurring during a second period of the future period, and a third phase occurring during a third period of the future period. The first period begins when the enabling condition(s) are satisfied, the second period begins when the first period ends, and the third period begins when the second period ends and corresponds to the end of the future period. Deceleration may increase (i.e., acceleration may decrease) during the first period, deceleration may be approximately constant or minimally decrease during the second period, and deceleration may decrease toward zero during the third period.

The target speed module 348 may determine the future period and percentages of the future period for the first, second, and third periods, respectively, based on the present vehicle speed 324 and the present vehicle acceleration 344 when the enabling condition(s) are met. A sum of the percentages is equal to 100 percent, and each of the percentages is less than or equal to 100 percent.

For example, the target speed module 348 may determine the future period and first, second, and third percentages based on the present vehicle speed 324 and the present vehicle acceleration 344 using one or more functions and/or mappings that relate vehicle speeds and accelerations to future periods and first, second, and third percentages. The target speed module 348 may then set the first period based on a product of the future period and the first percentage. The target speed module 348 may set the second period based on a product of the future period and the second percentage. The target speed module 348 may set the third period based on a product of the future period and the third percentage. In various implementations, the target speed module 348 may determine the first, second, and third periods directly based on the present vehicle speed 324 and the present vehicle acceleration 344 when the enabling condition(s) are met.

The target speed module 348 may also determine first, second, and third deceleration rates for the first, second, and third periods of the future period based on the present vehicle speed 324 and the present vehicle acceleration 344 when the enabling condition(s) are met. For example, the target speed module 348 may determine the first, second, and third deceleration rates based on the present vehicle speed 324 and the present vehicle acceleration 344 using one or more functions and/or mappings that relate vehicle speeds and accelerations to first, second, and third deceleration rates. One or more of the first, second, and third deceleration rates may be different than one or more other ones of the first, second, and third deceleration rates. The first, second, and/or third deceleration rate may vary within the first, second, or third period, respectively. The deceleration rate at the end of one period, however, may be equal to or within a predetermined amount of the deceleration rate of a beginning of a next period such that no step or large changes in deceleration occur. The target speed module 348 generates the target vehicle speed profile based on achieving the first, second, and third deceleration rates during the first, second, and third periods of the future period. The target vehicle speed profile controls the way that the vehicle is brought to a stop such that bringing the vehicle to a stop may be perceived by a driver as smooth, pleasing, repeatable, and is continuous with vehicle behavior (e.g., deceleration) prior to the CL state 330 transitioning to the active state.

When the CL state 330 is in a suspend state or an inactive state, the target speed module 348 may ramp the target vehicle speed toward the present vehicle speed 324 at a predetermined rate.

As stated above, the CL module 320 determines the CL torque 312 to adjust the vehicle speed 324 toward the target vehicle speed 328. Written another way, the CL module 320 determines the CL torque 312 to adjust the difference between the vehicle speed 324 and the target vehicle speed 328 toward zero. As road grade affects the vehicle speed 324, the CL module 320 learns road grade information, without directly sensing road grade, while the CL state 330 is in the active state. The road grade information may include or be represented by, for example, the CL torque 312 and/or one or more other learned parameters. The CL module 320 resets the learned road grade information (e.g., the CL torque 312) when the CL state 330 is in the inactive state. The CL module 320, however, does not reset learned grade information (e.g., the CL torque 312) when the CL state 330 is in the suspend state.

A CL state module 356 sets the CL state 330. For example, the vehicle speed 324 is less than a predetermined speed (that is greater than zero), the CL state module 356 may set the CL state 330 to the active state when the driver torque request 208 (or the motor torque request 234 generated according to the driver torque request 208) is zero or less than a predetermined torque. Additionally or alternatively, the CL state module 356 may set the CL state 330 to the active state when the vehicle is rolling forward down a grade when a drive mode 360 is in reverse or when the vehicle is moving backward down a grade when the drive mode 360 is drive, low, or another forward gear. The drive mode 360 may be, for example, park, drive, low, neutral, or reverse in some vehicles. The drive mode 360 may be provided based on a position of a park, reverse, neutral, drive, low (PRNDL) selector or lever that is actuated by a user. The purpose for transitioning the CL state 330 to the active state under these circumstances is to actively, using CL control, bring the vehicle to a stop despite the driver requesting torque, either via the accelerator pedal and/or the brake pedal, when the driver's torque request is insufficient to keep the vehicle from rolling in a direction opposite that of intended motion.

The CL state module 356 may set the CL state 330 to the suspend state when the APP and/or the BPP is greater than zero (indicating that the accelerator pedal and/or the brake pedal is depressed/applied) and/or the driver torque request 208 is greater than zero or greater than the predetermined torque. The CL state module 356 may set the CL state 330 to the inactive state when the vehicle speed 324 is outside of a predetermined speed range, occupancy of the driver is not detected, and/or when one or more other conditions are satisfied.

A FF module 364 (see also FIG. 5) determines the FF torque 316 to maintain the vehicle in place on a hill when a driver changes the drive mode 360 from the drive mode to the low mode while the vehicle speed 324 is zero. Under this circumstance, the change in the drive mode 360 may, without the FF module 364, allow the vehicle to roll down a grade. The FF module 364 is discussed further below.

As stated above, the motor torque module 304 determines the motor torque 308 based on the motor torque request 234, the CL torque 312, and the FF torque 316. A switching control module 370 controls switching of switches of the inverter module 256 to control power flow to and from the MGU(s) 198 based on the motor torque 308.

Figure 4:
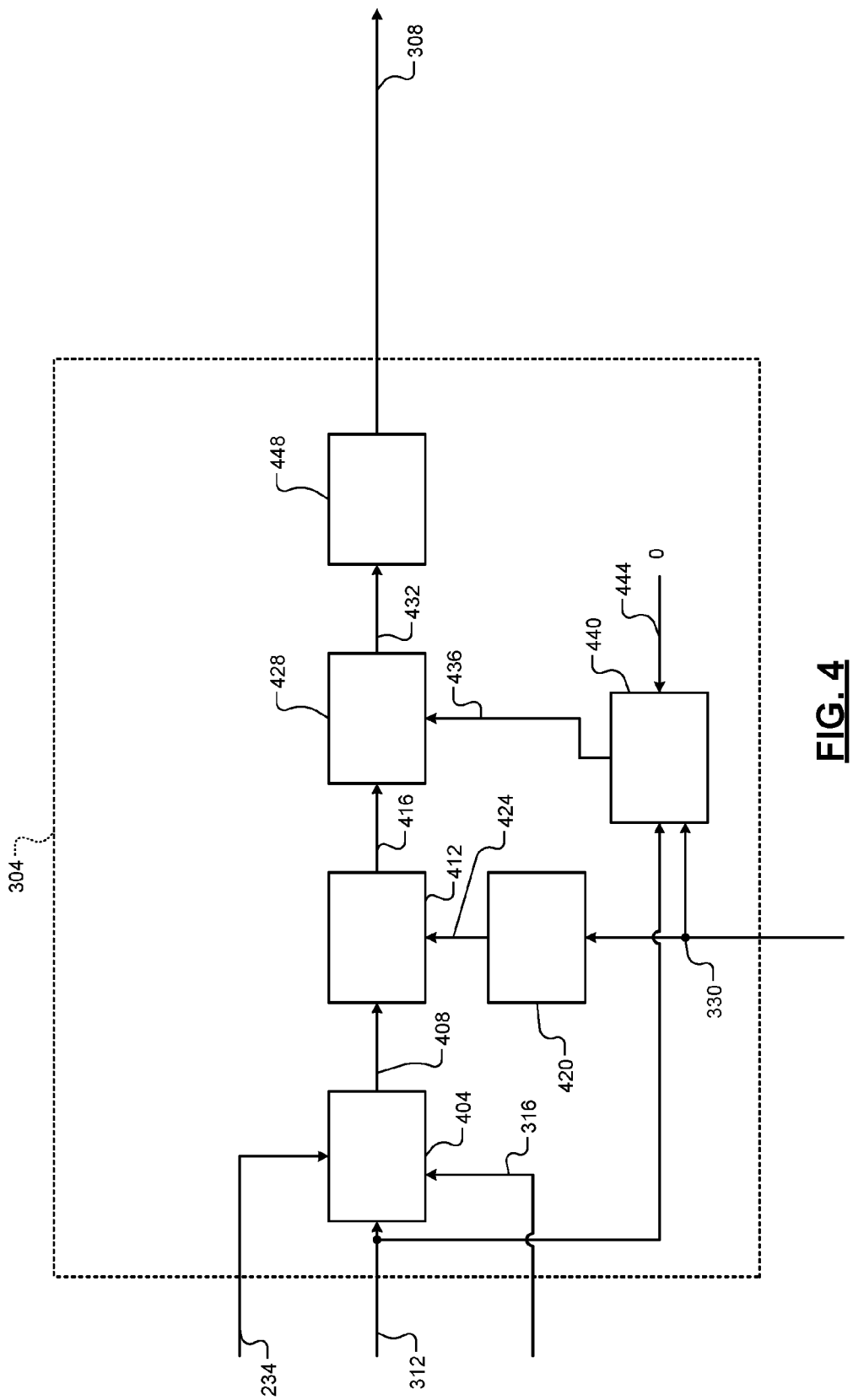
FIG. 4 is a functional block diagram including an example implementation of a motor torque module.

FIG. 4 is a functional block diagram of an example implementation of the motor torque module 304. A first summer module 404 sets a first motor torque 408 based on or equal to a sum of the motor torque request 234, the CL torque 312, and the FF torque 316.

A rate limiting module 412 produces the rate limited motor torque 416 by rate limiting changes in the first motor torque 408. More specifically, when the rate limited motor torque 416 is less than the first motor torque 408, the rate limiting module 412 increases the rate limited motor torque 416 toward the first motor torque 408 by up to a first maximum amount per control loop. When the rate limited motor torque 416 is greater than the first motor torque 408, the rate limiting module 412 decreases the rate limited motor torque 416 toward the first motor torque 408 by up to a second maximum amount per control loop. The rate limiting module 412 sets the rate limited motor torque 416 to the first motor torque 408 when the difference between the rate limited motor torque 416 and the first motor torque 408 is less than the one of the first and second maximum amounts.

The first and second maximum amounts are set by a maximums module 420 and are collectively illustrated by 424. The maximums module 420 sets the first and second maximum amounts 424 to first and second predetermined values, respectively, when the CL state 330 is in the active state. The maximums module 420 sets the first and second maximum amounts 424 to third and fourth predetermined values, respectively, when the CL state 330 is in the suspend state. The first and second predetermined values allow for larger changes per control loop than the third and fourth predetermined values.

A second summer module 428 sets a second motor torque 432 based on or equal to a sum of the rate limited motor torque 416 and a selected torque 436. A selection module 440 sets the selected torque 436 to one of the CL torque 312 and zero 444 based on the CL state 330. The selection module 440 sets the selected torque 436 to the CL torque 312 when the CL state 330 is in the active state. The selection module 440 sets the selected torque 436 to zero 444 when the CL state 330 is in the suspend state or the active state.

A limiting module 448 limits the second motor torque 432 to between upper and lower torque limits, inclusive, and outputs the motor torque 308. The upper and lower torque limits may be fixed predetermined values or the limiting module 448 may determine the upper and lower limits based on one or more present operating parameters, such as state of charge of the ESD 260.

Figure 5:
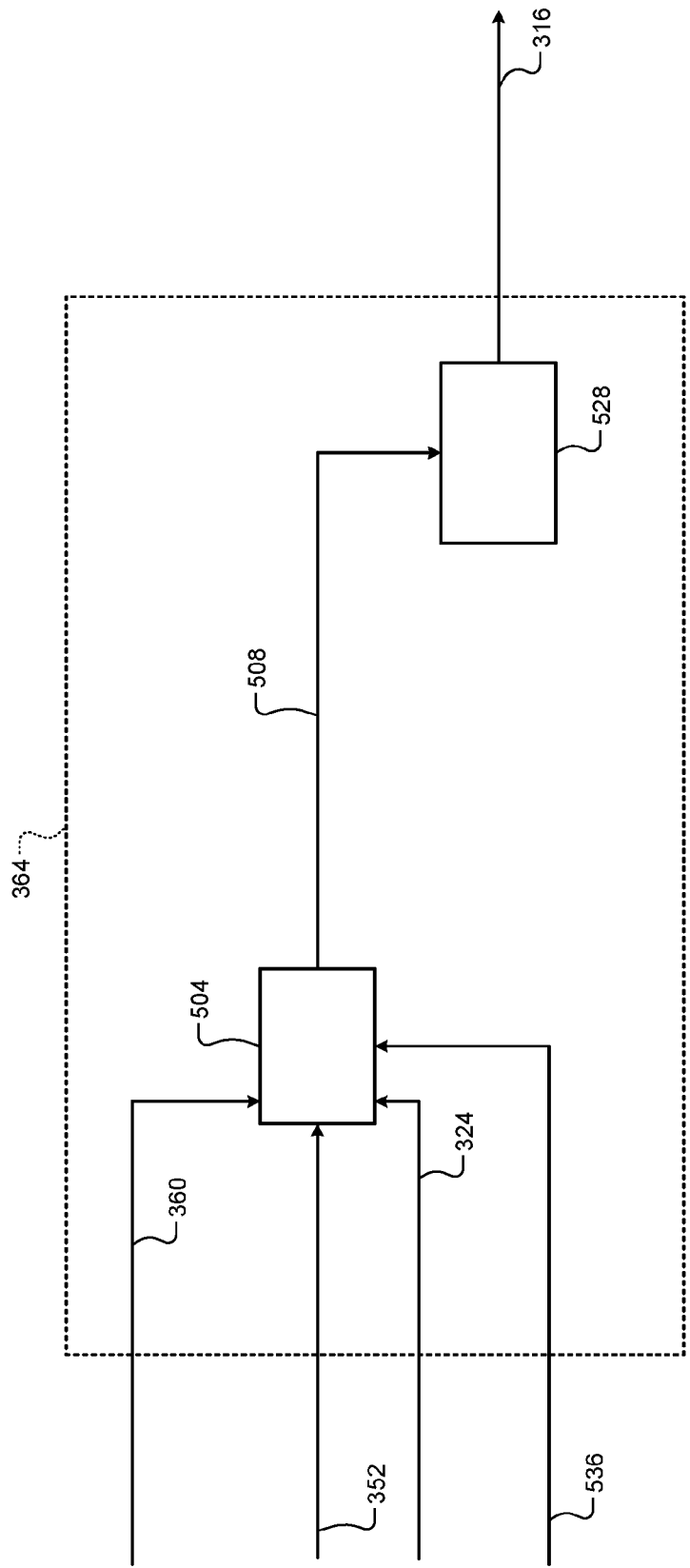
FIG. 5 is a functional block diagram including an example implementation of a feedforward (FF) module.

FIG. 5 is a functional block diagram of an example implementation of the FF module 364. A triggering module 504 selectively generates a trigger signal 508 based on the drive mode 360 and the vehicle speed 324. More specifically, the triggering module 504 generates the trigger signal 508 when all of: (i) the drive mode 360 transitions from drive to low; (ii) the vehicle speed 324 is zero (and the target vehicle speed 328 is also zero); and (iii) a brake pedal position (BPP) 536 indicates that the driver is not applying the brake pedal (e.g., BPP=0). The triggering module 504 may not generate the trigger signal 508 when at least one of (i), (ii), and (iii) is/are not met. When the drive mode 360 transitions from drive to low while the vehicle speed 324 is zero, the vehicle may move when the vehicle is on a non-zero grade. In such circumstances, the CL module 320 would respond by generating the CL torque 312 to bring the vehicle speed 324 back to zero, but the vehicle would move. The FF module 364 minimizes or prevents vehicle movement under such circumstances.

When the trigger signal 508 is generated, a FF determination module 528 determines the FF torque 316 to prevent vehicle movement despite the change in the drive mode 360 from drive to low. The FF determination module 528 determines the FF torque 316 based on the drive mode 360 transitioning from drive to low. The FF torque 316 may be a fixed predetermined value calibrated to maintain the vehicle stopped when the drive mode 360 transitions to low.

Referring back to FIG. 3, a storing module 380 selectively stores the CL torque 312 under some circumstances. For example, while the CL module 320 is generating the CL torque 312 based on the target vehicle speed 328 decreases toward/to zero, the storing module 380 stores the CL torque 312 when at least one of (i) the BPP 536 transitions from 0 to greater than 0 (indicating that the driver transitioned from not applying the brake pedal to applying the brake pedal); and (ii) an accelerator pedal position (APP) 384 transitions from 0 to greater than 0 (indicating that the driver transitioned from not applying the accelerator pedal to applying the accelerator pedal). The storing module 380 stores the CL torque 312 both when the vehicle speed 324 is zero and when the vehicle speed is non-zero and at least one of (i) and (ii) is satisfied.

Later, when both (i) and (ii) are no longer satisfied, the storing module 380 outputs the stored CL torque as a stored CL torque 388. In other words, the storing module 380 outputs the stored CL torque as the stored CL torque 388 when, after storing the CL torque 312, the BPP 536 transitions from greater than 0 to 0 (indicating the driver released the brake pedal) and/or the APP 384 transitions from greater than 0 to 0 (indicating the driver released the accelerator pedal). The CL module 320 then sets the CL torque 312 to the stored CL torque 388. In this manner, the storing module 380 seeds the CL module 320 with the storing stored CL torque 388 when the driver releases the brake pedal and/or the accelerator pedal. This prevents the CL module 320 from having to re-learn the CL torque 312 back to the stored CL torque 388 and may decrease time that the vehicle moves.

As an example, consider the example situation of the vehicle speed of 3 kph on a 7% grade with the driver not applying the brake or accelerator pedals and the vehicle speed being decreased via the CL module 320 as the target vehicle speed 328 decreases toward zero. If the driver applies the brake pedal, the storing module 380 stores the CL torque 312. If the driver later releases the brake pedal after the vehicle speed has reached zero, the CL module 320 could set the CL torque 312 based on the stored CL torque. For example, the CL module 320 may determine the CL torque 312 by extrapolating the stored CL torque and the vehicle speed when the CL torque 312 was stored for a vehicle speed of zero. This is helpful for when the driver releases the brake at a stop. The CL module 320 may maintain the vehicle stopped via the stored CL torque or would have to change the CL torque 312 less to maintain the vehicle stopped.

As another example, consider the example situation of the vehicle speed of zero (after transitioning to zero via the CL module 320) on a non-zero (or zero) grade and the driver not applying the brake or accelerator pedals. If the driver applies the accelerator pedal, the storing module 380 stores the CL torque 312. If the driver later releases the accelerator pedal, the CL module 320 sets the CL torque 312 based on the stored CL torque. For example, the CL module 320 may determine the CL torque by extrapolating the stored CL torque, given the vehicle speed of zero, for the present vehicle speed.

Figure 6:
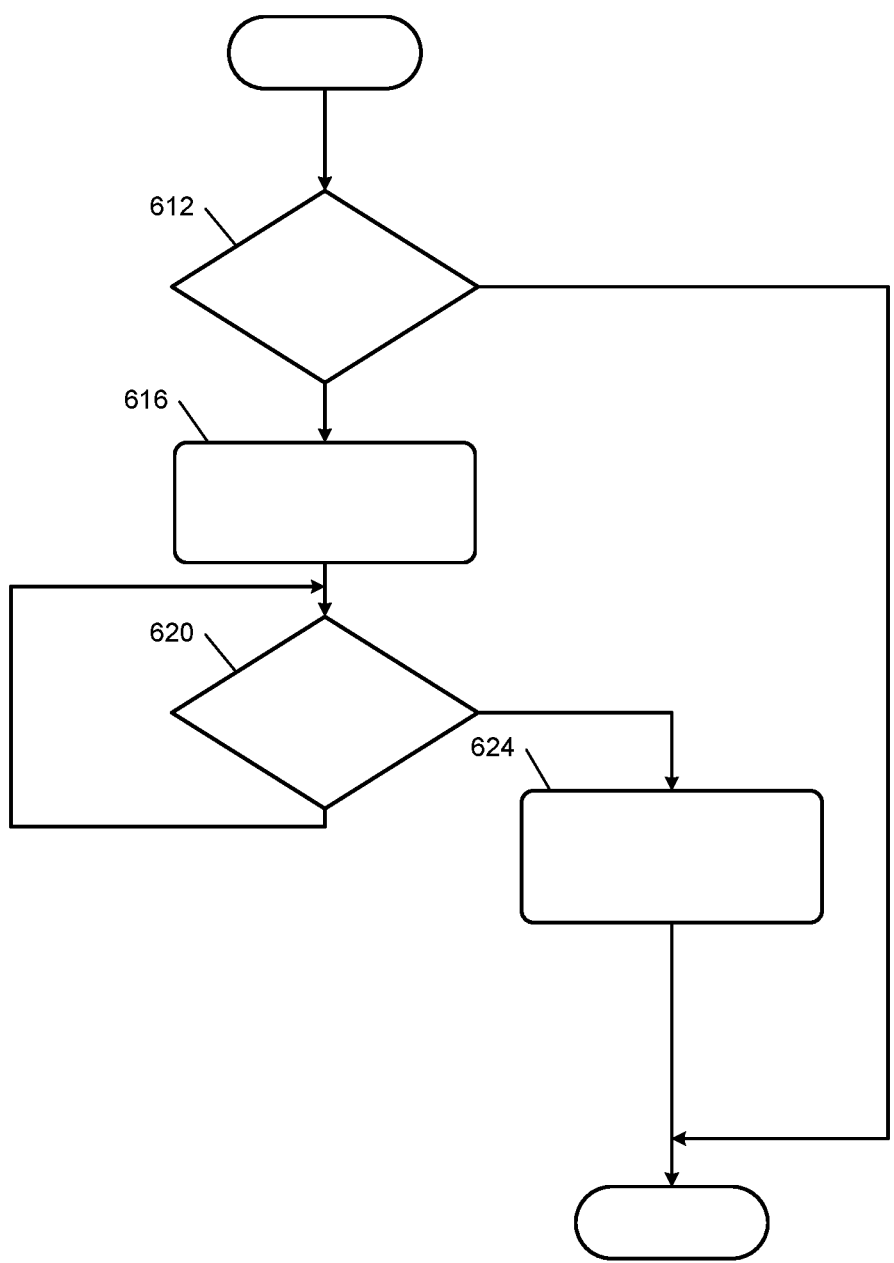
FIG. 6 is a flowchart depicting an example method of storing and updating a closed-loop torque for electric motor control.

FIG. 6 is a flowchart depicting an example method for storing and updating the CL torque 312. As described above, the CL module 320 may set the CL torque 312 based on reducing a difference between the vehicle speed 324 and the target vehicle speed 328 to zero. Control begins with 612 when the CL state 330 is in the active state. The vehicle speed 324 may be zero or non-zero at 612.

At 612, the storing module 380 determines whether the driver transitioned from not applying the brake pedal to applying the brake pedal and/or transitioned from not applying the accelerator pedal to applying the accelerator pedal. For example, the storing module 380 may determine whether the BPP 536 transitioned from 0 to greater than 0 and/or whether the APP 384 transitioned from 0 to greater than 0. As another example, the storing module 380 may determine whether the CL state 330 transitioned from the active state to the suspend state. If 612 is true, the storing module 380 stores the CL torque 312 at 616, and control continues with 620. If 612 is false, control may end.

At 620, the storing module 380 may determine whether the driver has released the (previously applied) at least one of the brake pedal and the accelerator pedal. For example, the storing module 380 may determine whether the BPP 536 and APP 384 are zero at 620. If 620 true, the CL module 320 may set the CL torque 312 based on the stored CL torque 388 at 624. For example, the CL module 320 may determine a CL torque 312 based on the stored CL torque 388, the vehicle speed 328 when the stored CL torque 388, and the present value of the vehicle speed 328 and set the CL torque 312 to that determined CL torque. If 620 is false, control may return to 620. Control may also verify that CL control is still in the suspend state or has not transitioned to the inactive state. While control is shown and discussed as ending, the example of FIG. 6 corresponds to one control loop and a control loop may be started each predetermined period.

Figure 7:
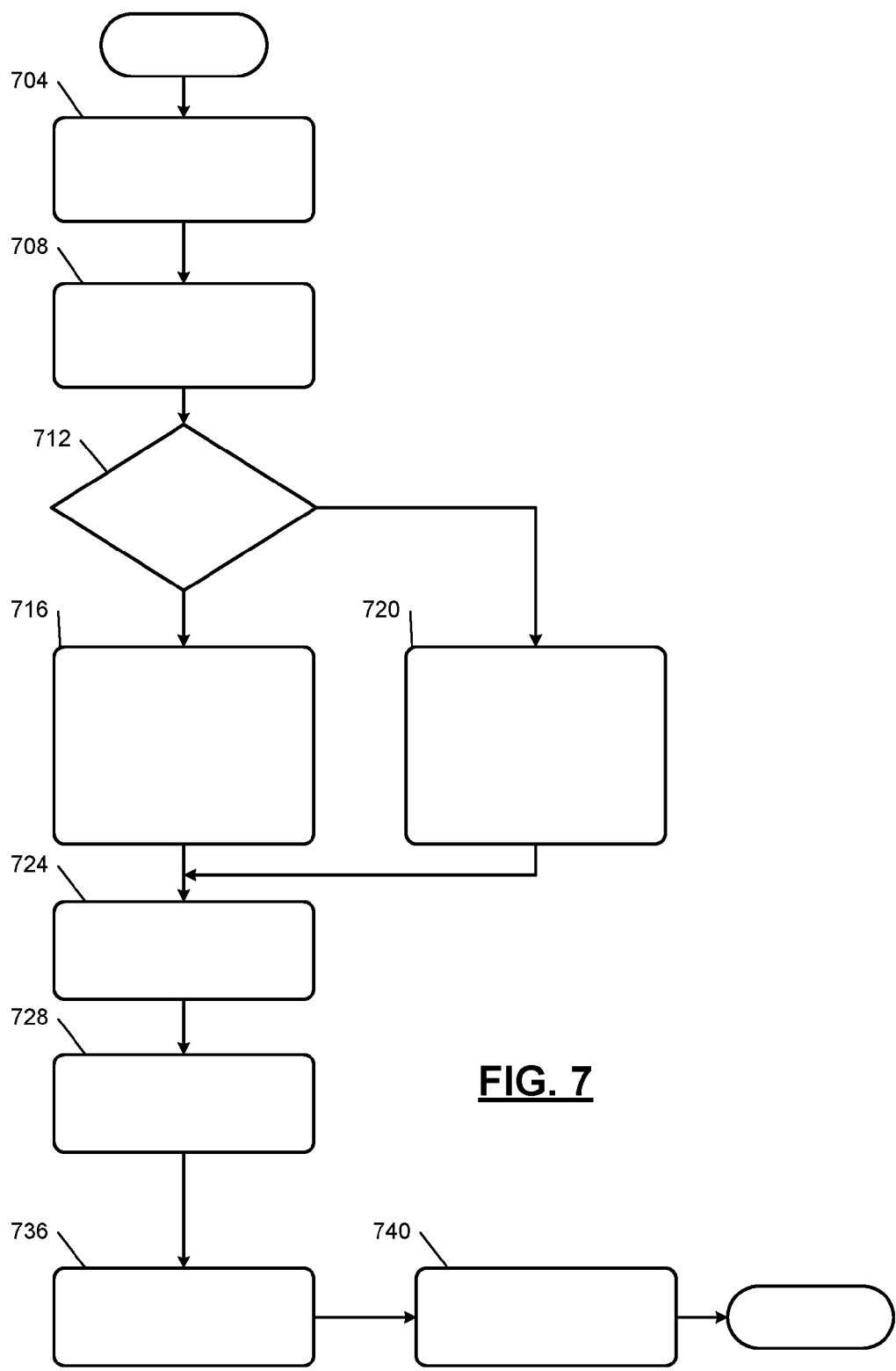
FIG. 7 is a flowchart depicting an example method of controlling an electric motor.

FIG. 7 includes a flowchart depicting an example method of controlling an electric motor. Control begins with 704 where the hybrid module 228 determines the motor torque request 234, the CL module 320 determines the CL torque 312, and the FF module determines the FF torque 316. At 708, the first summer module 404 sets the first motor torque 408 based on or equal to a sum of the CL torque 312, the FF torque 316, and the motor torque request 234.

At 712, the maximums module 420 and the selection module 440 determine whether the CL state 330 is in the active state. If 712 is true, control continues with 716. The maximums module 420 sets the first and second maximum amounts to the first and second predetermined values at 716. The selection module 440 also sets the selected torque 436 to the CL torque 312 at 716. At 720, the maximums module 420 sets the first and second maximum amounts to the third and fourth predetermined values, and the selection module 440 also sets the selected torque 436 to zero 444. Control continues with 724. The first and second predetermined values allow for greater changes in the first motor torque 408 (for operation with the active CL state 330) than the third and fourth predetermined values.

At 724, the rate limiting module 412 determines the rate limited motor torque 416 by rate limiting changes in the first motor torque 408 by up to the first maximum amount (when the first motor torque 408 increases) or by up to the second maximum amount (when the first motor torque 408 decreases). The second summer module 428 sets the second motor torque 432 based on or equal to a sum of the rate limited motor torque 416 and the selected torque 436 at 728.

The limiting module 448 limits the second motor torque 432 to between the upper and lower torque limits at 732 to produce the motor torque 308. More specifically, when the second motor torque 432 is between the upper and lower torque limits, the limiting module 448 sets the motor torque 308 equal to or based on the second motor torque 432. When the second motor torque 432 is greater than the upper torque limit, the limiting module 448 sets the motor torque 308 to the upper torque limit. When the second motor torque 432 is less than the lower torque limit, the limiting module 448 sets the motor torque 308 to the lower torque limit.

At 740, the switching control module 370 controls switching of switches of the inverter module 256 based on the motor torque 308. The inverter module 256 therefore applies power to the MGU(s) 198 based on achieving the motor torque 308. While control is shown and discussed as ending, the example of FIG. 7 corresponds to one control loop and a control loop may be started each predetermined period.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. §112(f) unless an element is expressly recited using the phrase "means for," or in the case of a method claim using the phrases "operation for" or "step for."

What is claimed is:

1. An electric motor control system for a vehicle, comprising:
   a vehicle speed module that determines a vehicle speed;
   a closed loop (CL) module that determines a CL torque based on a difference between a target vehicle speed and the vehicle speed;
   a motor torque module that determines a motor torque based on the CL torque and a motor torque request determined based on a position of an accelerator pedal;
   a target speed module that selectively sets the target vehicle speed based on adjusting the vehicle speed to a predetermined speed of zero in response to receipt of an input by a driver to an input device that is different than the accelerator pedal and a brake pedal; and
   a switching control module that controls switching of an inverter based on the motor torque to control application of power to an electric motor of the vehicle.

2. The electric motor control system of claim 1 wherein the CL module determines the CL torque to adjust the difference between the target vehicle speed and the vehicle speed toward zero.

3. The electric motor control system of claim 1 wherein the motor torque module determines the motor torque further based on a feedforward (FF) torque.

4. The electric motor control system of claim 3 wherein the motor torque module:
   determines a first motor torque based on a sum of the CL torque, the FF torque, and the motor torque request;
   rate limits changes in the first motor torque to first and second maximum amounts to produce a rate limited motor torque;
   determines a second motor torque based on a sum of the rate limited motor torque and a selected torque; and
   limits the second motor torque to between upper and lower torque limits to produce the motor torque.

5. The electric motor control system of claim 4 wherein the motor torque module:
   sets the first and second maximum amounts to first and second predetermined values, respectively, when a CL state is in a first state; and
   sets the first and second amounts to third and fourth predetermined values, respectively, when the CL state is in a second state.

6. The electric motor control system of claim 5 wherein the motor torque module:
   sets the selected torque to the CL torque when the CL state is in the first state; and
   sets the selected torque to zero when the CL state is in the second state.

7. The electric motor control system of claim 3 further comprising a FF module that sets the FF torque based on a stored value of the FF torque when the vehicle speed is zero and a drive mode transitions from a drive mode to a low mode.

8. The electric motor control system of claim 1 further comprising a storing module that stores the CL torque when at least one of:
   a driver actuates the accelerator pedal away from a first resting position; and
   the driver actuates a brake pedal away from a second resting position;
   wherein the CL module sets the CL torque equal to the stored CL torque when, after the at least one of the actuation of the accelerator pedal and the brake pedal, the accelerator pedal and the brake pedal are in the first and second resting positions, respectively, and determines the CL torque based on the difference after the setting.

9. An electric motor control method for a vehicle, comprising:
   determining a vehicle speed;
   determining a closed loop (CL) torque based on a difference between a target vehicle speed and the vehicle speed;
   determining a motor torque based on the CL torque and a motor torque request determined based on a position of an accelerator pedal;
   setting the target vehicle speed based on adjusting the vehicle speed to a predetermined speed of zero in response to receipt of an input by a driver to an input device that is different than the accelerator pedal and a brake pedal; and
   controlling switching of an inverter based on the motor torque to control application of power to an electric motor of the vehicle.

10. The electric motor control method of claim 9 wherein determining the CL torque includes determining the CL torque to adjust the difference between the target vehicle speed and the vehicle speed toward zero.

11. The electric motor control method of claim 9 wherein determining the motor torque includes determining the motor torque further based on a feedforward (FF) torque.

12. The electric motor control method of claim 11 wherein determining the motor torque includes:
   determining a first motor torque based on a sum of the CL torque, the FF torque, and the motor torque request;
   rate limiting changes in the first motor torque to first and second maximum amounts to produce a rate limited motor torque;
   determining a second motor torque based on a sum of the rate limited motor torque and a selected torque; and
   limiting the second motor torque to between upper and lower torque limits to produce the motor torque.

13. The electric motor control method of claim 12 wherein determining the motor torque includes:
   setting the first and second maximum amounts to first and second predetermined values, respectively, when a CL state is in a first state; and
   setting the first and second amounts to third and fourth predetermined values, respectively, when the CL state is in a second state.

14. The electric motor control method of claim 13 wherein determining the motor torque includes:
   setting the selected torque to the CL torque when the CL state is in the first state; and
   setting the selected torque to zero when the CL state is in the second state.

15. The electric motor control method of claim 11 further comprising setting the FF torque based on a stored value of the FF torque when the vehicle speed is zero and a drive mode transitions from a drive mode to a low mode.

16. The electric motor control method of claim 9 further comprising storing the CL torque when at least one of:
- a driver actuates the accelerator pedal away from a first resting position; and
- the driver actuates a brake pedal away from a second resting position;

wherein setting the CL torque includes:

setting the CL torque equal to the stored CL torque when, after the at least one of the actuation of the accelerator pedal and the brake pedal, the accelerator pedal and the brake pedal are in the first and second resting positions, respectively; and determining the CL torque based on the difference after the setting.

\* \* \* \* \*